April 6, 1948.    J. E. McGLAUN    2,439,312
RESILIENT WHEEL
Filed Jan. 24, 1947
Fig. 1.
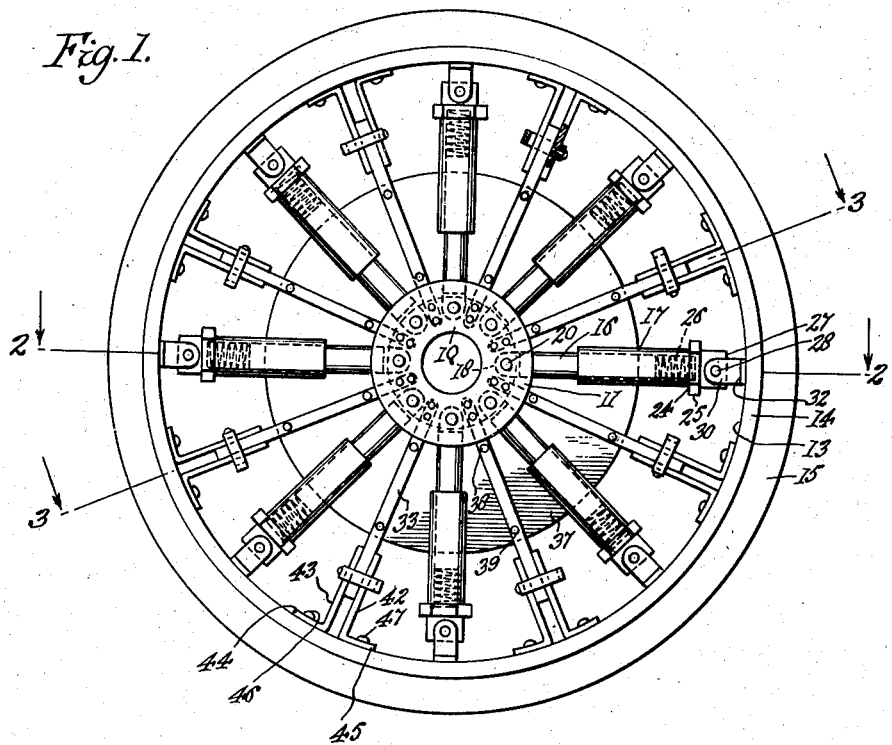
Fig. 2.
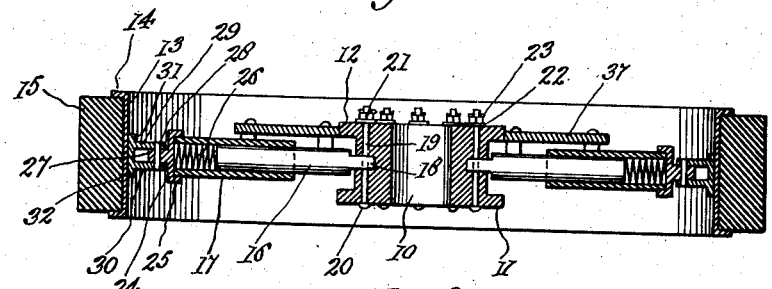
Fig. 3.
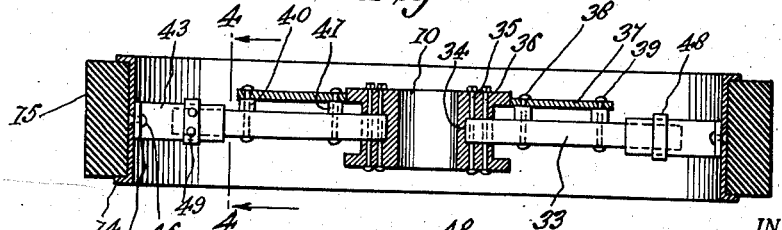
Fig. 4.
INVENTOR.
Jasper E. McGlaun
BY
Wilkinson & Mawhinney
Attorneys Patented Apr. 6, 1948

2,439,312

UNITED STATES PATENT OFFICE 2,439,312

RESILIENT WHEEL

Jasper E. McGlaun, Shellman, Ga.

Application January 24, 1947, Serial No. 724,160

4 Claims. (Cl. 152—100)

The present invention relates to improvements in resilient wheels and has for an object to provide a type of wheel constructed and arranged for use on all types of vehicles, either horse-drawn or motor-driven, or on the landing gear of airplanes.

Another object of the invention is to provide an improved resilient wheel of strong and cheap construction designed to eliminate pneumatic tires with the aim and purpose of decreasing fatalities and the crippling of human beings incident to wrecks where tires carrying air are employed.

A further object of the invention is to provide an improved construction of resilient wheel for vehicles in which a double set of spokes is provided, one set being for the purpose of embodying resiliency in the wheel while the other set of spokes is for the purpose of driving the outer rim to secure propulsion of the vehicle.

With the foregoing and other objects in view, the invention will be more fully described hereinafter and more particularly pointed out in the appended claims.

In the drawings, in which like parts are denoted by the same reference characters throughout the several views, Figure 1 is a side elevational view, with parts shown broken away and in section, of an improved resilient wheel constructed in accordance with the present invention.

Figure 2 is a cross-section taken on the line 2—2 in Figure 1.

Figure 3 is also a cross-section taken on the line 3—3 in Figure 1.

Figure 4 is a section taken on the line 4—4 in Figure 3.

Referring more particularly to the drawings, 10 designates the hub which is adapted to be affixed to the axle or to be rotatable around a stub steering axle, such hub being preferably reinforced by marginal inner and outer flanges 11 and 12.

The rim is indicated at 13 and may be of a high quality steel of a flexible or deformable nature. Outturned flanges 14 at the sides of the rim 13 provide an annular channel for receiving the solid cushion tire 15 which may be of rubber or some other resilient composition.

The spoke members which contribute the resiliency to the wheel are mounted in suitable numbers angularly spaced about the wheel and involve the plunger spokes 16 and the cylinder spokes 17. The inner ends of the plunger spokes 16 are formed with flattened perforated ears 18 having rounded inner edges which are adapted to rotate or rock in sockets provided preferably in the intermediate portion of the hub 10. Bolts 19 pass laterally through the hub 10 and through the eyes or perforations of the ears 18 and thus pivotally couple the plunger spokes 16 to the hub. The bolts 19 have heads 20 at one end and nuts 21 threaded upon the other end. Such nuts 21 engage spring, lock or other washers 22 which engage the side face of the hub 10. The end portions of the bolts 19 which project beyond the nuts 21 may have transverse holes for cotter keys 23.

The cylinder spokes 17 are enclosed at their ends by cylinder heads or caps 24 having flanges 25 which encircle the outer portions of the cylinders 17 and may be welded or otherwise secured thereto. Coil springs 26 are confined in the outer portions of the cylinder spokes 17 by the caps 24 and have their inner ends abutting against the outer ends of the plunger spokes 16. Flat perforated ears 27 project outwardly from the caps 24 and receive pivots or pintles 28 by which the same are pivotally mounted in cleats 29 and 30. Such cleats may be L-shaped. Otherwise stated, these cleats have base flanges 31 and 32 fitted against the inside surface of the rim 13 to which they may be welded or otherwise affixed. If desired, the two cleats of each resilient spoke member may be made integral as indicated in Figure 2.

Referring more particularly to Figures 1 and 3, 33 designate propeller spokes which are also mounted in any suitable number around the circle of the wheel and preferably alternate with the resiliency spokes. These spokes are mounted at their inner ends in sockets 34 of the hub 10 and are further secured to the hub by means of the double row of the circular series of bolts 35 and 36 mounted through the hub 10. The propeller spokes 33 are also reinforced and steadied by a disc 37 lying laterally of the propeller spokes 33 with its edgewise dimension substantially radial of the wheel and approximately parallel to the axes of the propeller spokes 33. Two or more circular series of bolts or other fastenings 38 and 39 connect inner and outer portions of the disc 37 in common to all of the propeller spokes 33. Preferably the propeller spokes 33 are spaced axially from the disc 37 as by the outer and inner rings 40 and 41 through which the bolts 38 and 39 may also pass. Thus the disc 37 which extends in common to all of the propeller spokes 33 forms with such spokes and with the rings 40 and 41 a trussed construction which reinforces and strengthens all of these members and which is aided also by the fact that the inner edge of the disc 37 fits preferably rather snugly over the hub flange 12. Also the hub bolts 35 and the socket 34 contribute to the strength of this construction.

Pairs of flat spring bars 42 and 43 carried by the rim 13 are positioned in spaced apart relationship to slidably and flexibly receive the outer ends of the rigid propeller spokes which terminate short of such rim. These flat spring bars 42 and 43 may be L-shaped and have flanges 44 and 45 fitting against the rim and welded or otherwise secured thereto, for instance by the rivets 46 and 47.

As shown more particularly in Figure 4 collars 48, preferably square, are fitted about the flat spring bars 42 and 43 at inner portions thereof for including the outer ends of the rigid propeller spokes 33 when the same are either in an inner or outer position. Rivets or other fastenings 49 secure the collars 48 to one of the flat spring bars as shown in Figure 4, the collars being unattached to the companion flat spring bars 42.

Instead of the pivots 18, 19 and 28, ball and socket or universal joints may be used.

The resiliency spokes are inserted in the wheel with sufficient tension to hold the hub in the exact center of the rim at all times, or to force the hub back to center after compression has been caused by running over any object that would have a tendency to cause the weight of the vehicle to spring. The propeller spokes or bars 33 act to propel the vehicle and they also serve as stabilizers when compression has been effected in the coil springs 26 of the cylinder and plunger spoke members. Such propeller spokes 33 in combination of course with the flat spring bars 42 and 43 also tend to hold the rim 13 when the brakes are applied.

The disc mounting also provides strength in the propeller bars 33 for resisting any relative rotation between the hub and the rim.

The flat steel bars 42 and 43 will be of a tension to allow the wheel to give when compression has been effected and will react to restore the parts to the normal position after the distorting force has been passed over.

The square collars 48 being fastened to only one of each pair of springs 43 allow the pair of springs 42 and 43 to give to the desired distance and then stops further expansion. These collars 48 also serve the purpose of holding the propeller bars 33 in position, keeping them from sliding out from between the spring bars 42 and 43 when the vehicle is either turned short or rounding a curve.

The rim 13 of the wheel will preferably be constructed of high quality steel sufficient to carry the weight of the vehicle. The tire 15 carried by this rim 13 will engage the road surface for the purpose of absorbing noise and effecting desired tread.

While I have disclosed herein the best form of the invention known to me at the present time, I desire it to be understood that I reserve the right make changes and modifications in the herein described embodiment of the invention provided such changes fall within the scope of the following claims.

What I claim is:

1. A resilient wheel comprising a hub, a rim, resiliency-producing spoke members between said hub and rim, propulsion spoke members comprising rigid bar elements and pairs of spring bar elements slidably receiving adjacent end portions of the rigid bar elements, the remote ends of the elements connected respectively to said hub and rim, a disc parallel to the radii of the wheel, a plurality of rings separating the disc from said rigid bar elements, said rings being spaced from one another, and fastenings passing through said disc and said rigid bar elements and through the interposed rings to provide a truss construction.

2. A resilient wheel as claimed in claim 1 wherein the inner edge of the disc engages a part of the hub.

3. A resilient wheel comprising a hub, a rim, resiliency-producing spoke members between said hub and rim, propulsion spoke members comprising rigid bar elements and pairs of spring bar elements slidably receiving adjacent end portions of the rigid bar elements, the remote ends of the elements connected respectively to said hub and rim, a collar surrounding each pair of spring bar elements so placed as to include the telescoped adjacent ends of the rigid bar elements, and means for affixing each collar to only one of its pair of spring bar elements.

4. A resilient wheel comprising a hub, a rim, resiliency-producing spoke members between said hub and rim, propulsion spoke members comprising rigid bar elements and pairs of spring bar elements slidably receiving adjacent end portions of the rigid bar elements, the remote ends of the elements connected respectively to said hub and rim, said spring bar elements being substantially L-shaped with flanges fitting in and attached to said rim.

JASPER E. McGLAUN.

REFERENCES CITED

The following references are of record in the file of this patent:

UNITED STATES PATENTS

| Number | Name | Date |
| --- | --- | --- |
| 1,063,771 | Brown | June 3, 1913 |
| 1,409,624 | Ugaldea et al. | Mar. 14, 1922 |
| 1,650,609 | Cravens | Nov. 29, 1927 |